United States Patent
Nishijima

(10) Patent No.: US 7,538,714 B2
(45) Date of Patent: May 26, 2009

(54) SYSTEM FOR MEASURING PHYSICAL RELATIONSHIP BETWEEN VEHICLE AND OBJECT

(75) Inventor: Fumiyoshi Nishijima, Takahama (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 12/070,562

(22) Filed: Feb. 20, 2008

(65) Prior Publication Data

US 2008/0198064 A1   Aug. 21, 2008

(30) Foreign Application Priority Data

Feb. 21, 2007   (JP)   ............... 2007-041127

(51) Int. Cl.
*G01S 13/32* (2006.01)
*G01S 7/40* (2006.01)

(52) U.S. Cl. ............... 342/70; 342/71; 342/72; 342/128; 342/173; 342/174; 342/82

(58) Field of Classification Search ............ 342/70–72, 342/173, 174, 82–85, 118, 128
See application file for complete search history.

(56) References Cited

U.S. PATENT DOCUMENTS

| | | | |
|---|---|---|---|
| 5,717,399 A | 2/1998 | Urabe et al. | |
| 5,841,393 A * | 11/1998 | Saito et al. | 342/165 |
| 6,646,589 B2 * | 11/2003 | Natsume | 342/70 |
| 6,831,595 B2 * | 12/2004 | Isaji | 342/173 |
| 7,397,419 B2 * | 7/2008 | Nakano et al. | 342/173 |
| 7,456,781 B2 * | 11/2008 | Honda | 342/173 |
| 2005/0110673 A1 * | 5/2005 | Izumi et al. | 342/70 |
| 2007/0109176 A1 * | 5/2007 | Nakanishi et al. | 342/70 |
| 2008/0198064 A1 * | 8/2008 | Nishijima | 342/118 |

FOREIGN PATENT DOCUMENTS

| | | |
|---|---|---|
| JP | 08-146131 | 6/1996 |
| JP | 11-073203 | 3/1999 |
| JP | 2003-329773 | 11/2003 |
| JP | 2004-053569 | 2/2004 |
| JP | 2004-054569 | 2/2004 |
| JP | 2005-227030 | 8/2005 |
| JP | 2006-177979 | 7/2006 |
| JP | 2007-240312 | 9/2007 |

OTHER PUBLICATIONS

Office action dated Sep. 30, 2008 in Japanese Application No. 2007-041127 with English translation thereof.

* cited by examiner

*Primary Examiner*—John B Sotomayor
(74) *Attorney, Agent, or Firm*—Harness, Dickey & Pierce, PLC

(57) ABSTRACT

In a radar system installed in a vehicle, a first measuring unit measures a first physical relationship between the vehicle and a first object based on a received first echo signal A second measuring unit measures a second physical relationship between the vehicle and a second object based on a received second echo signal. A failure detector detects whether a failure occurs in each of the first and second measuring units. When it is detected that a failure occurs in one of the first and second measuring units, an alternative control unit causes the other of the first and second measuring units to serve as an alternative to the one of the first and second measuring units to thereby measure a corresponding one of the first and second physical relationships.

6 Claims, 9 Drawing Sheets

FIG. 2
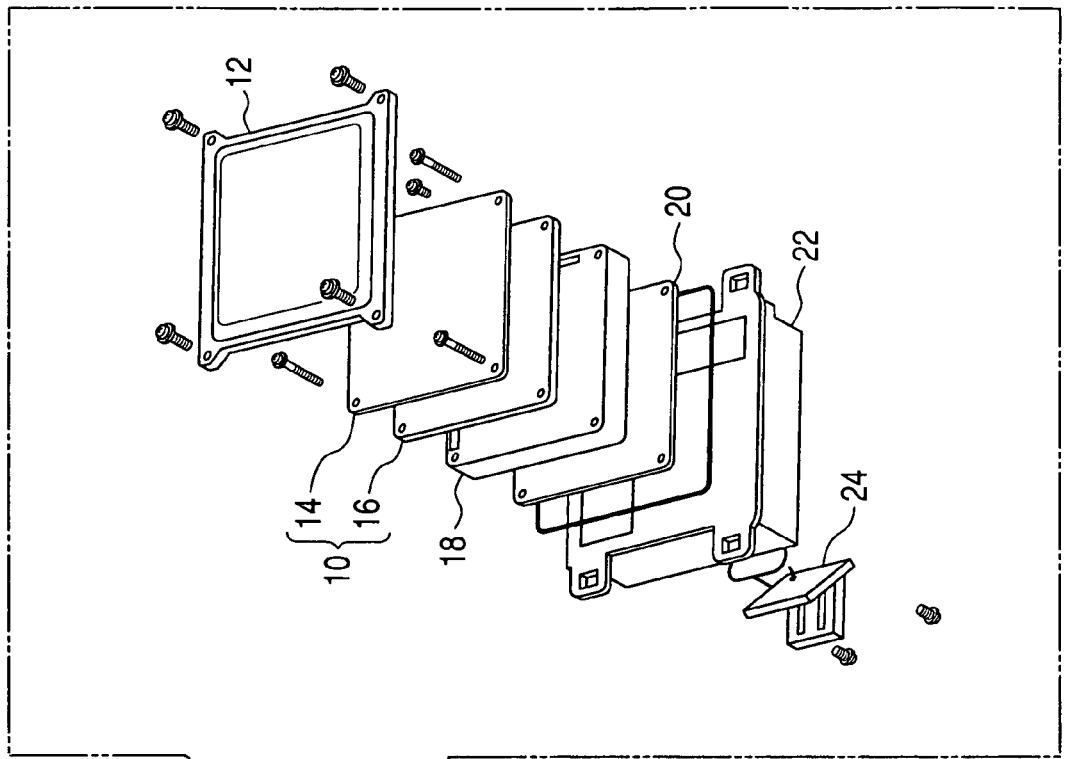
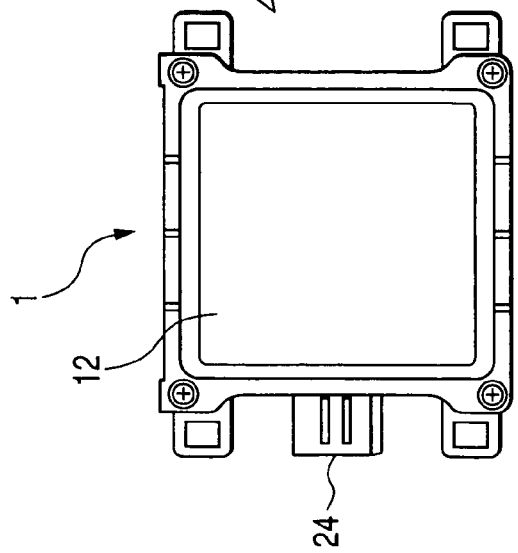

SYSTEM FOR MEASURING PHYSICAL RELATIONSHIP BETWEEN VEHICLE AND OBJECT

CROSS REFERENCE TO RELATED APPLICATIONS

This application is based on Japanese Patent Application 2007-041127 filed on Feb. 21, 2007. This application claims the benefit of priority from the Japanese Patent Application, so that the descriptions of which are all incorporated herein by reference.

FIELD OF THE INVENTION

The present invention relates to a system installed in a vehicle and designed to measure a first physical relationship between the vehicle and a first object and, and a second physical relationship between the vehicle and a second object located to be closer to the vehicle than the first object.

BACKGROUND OF THE INVENTION

Adaptive cruise control (ACC) for driving comfort is, for example, a method of automatically controlling the speed of a vehicle. Specifically, when there are no leading vehicles, the adaptive cruise control works to set the vehicle's speed to a desired constant speed determined by, for example, the driver.

When a leading vehicle is encountered, the adaptive cruise control works to alter the vehicle speed to maintain a desired interval with respect to the leading vehicle while following the leading vehicle.

In addition, pre crash safety (PCS) for driving safety is, for example, a method of providing braking assist and seatbelt retraction, and prompting the driver to take action to avoid a collision and reduce damage when it is determined that the vehicle will collide with a leading vehicle.

A conventional radar device disclosed in U.S. Pat. No. 5,717,399 corresponding to Japanese Patent Application Publication No. H08-146131 includes:

- a first radar module to measure a first distance between a subject vehicle in which the radar device is installed and a remote leading vehicle in front of the subject vehicle for execution of the ACC; and
- a second radar module to measure a second distance between the subject vehicle and an adjacent obstacle in front of the subject vehicle for execution of the PCS.

In the conventional radar device disclosed in the U.S. Pat. No. 5,717,399, if a failure occurs in, for example, the first radar module, the ACC based on the first distance measured by the first module cannot be executed.

Similarly, in the conventional radar device disclosed in the U.S. Pat. No. 5,717,399, if a failure occurs in, for example, the second radar module, the PCS cannot be executed.

Specifically, in the conventional radar device disclosed in the U.S. Pat. No. 5,717,399, a malfunction in either the first radar module or the second radar module may reduce corresponding one of driving comfort and driving safety.

SUMMARY OF THE INVENTION

In view of the circumstances set force above, an object of an aspect of the present invention is to provide a system installed in a vehicle for measuring a first physical relationship between the vehicle and a first surrounding object and a second physical relationship between the vehicle and a second surrounding object if a failure occurs in a part of the system.

According to one aspect of the present invention, there is provided a radar system installed in a vehicle. The radar system includes a transmitter configured to transmit a first radio wave over a first part of a surrounding area of the vehicle, and receive a first echo signal generated by reflection of the first radio wave from a first object located within the first part of the surrounding area The transmitter is configured to transmit a second radio wave over a second part of the surrounding area of the vehicle. The second radio wave is distinguished from the first radio wave. The second part of the surrounding area is at least partly different from the first part thereof. The transmitter is configured to receive a second echo signal generated by reflection of the second radio wave from a second object located within the second part of the surrounding area. The radar system includes a first measuring unit configured to measure a first physical relationship between the vehicle and the first object based on the received first echo signal, and a second measuring unit configured to measure a second physical relationship between the vehicle and the second object based on the received second echo signal. The radar system includes a failure detector operatively connected to each of the first measuring unit and the second measuring unit and configured to detect whether a failure occurs in each of the first and second measuring units. The radar system includes an alternative control unit configured to, when it is detected that a failure occurs in one of the first and second measuring units, cause the other of the first and second measuring units to serve as an alternative to the one of the first and second measuring units to thereby measure a corresponding one of the first and second physical relationships.

With the structure of the radar system, when it is detected that a failure occurs in one of the first and second measuring units, the other of the first and second measuring units can measure a corresponding one of the first physical relationship between the vehicle and the first object and the second physical relationship between the vehicle and the second object.

BRIEF DESCRIPTION OF THE DRAWINGS

Other objects and aspects of the invention will become apparent from the following description of embodiments with reference to the accompanying drawings in which:

FIG. 2 is an enlarged exploded perspective view schematically illustrating the hardware structure of the radar system illustrated in FIG. 1;

DETAILED DESCRIPTION OF EMBODIMENTS OF THE INVENTION

Figure 1:
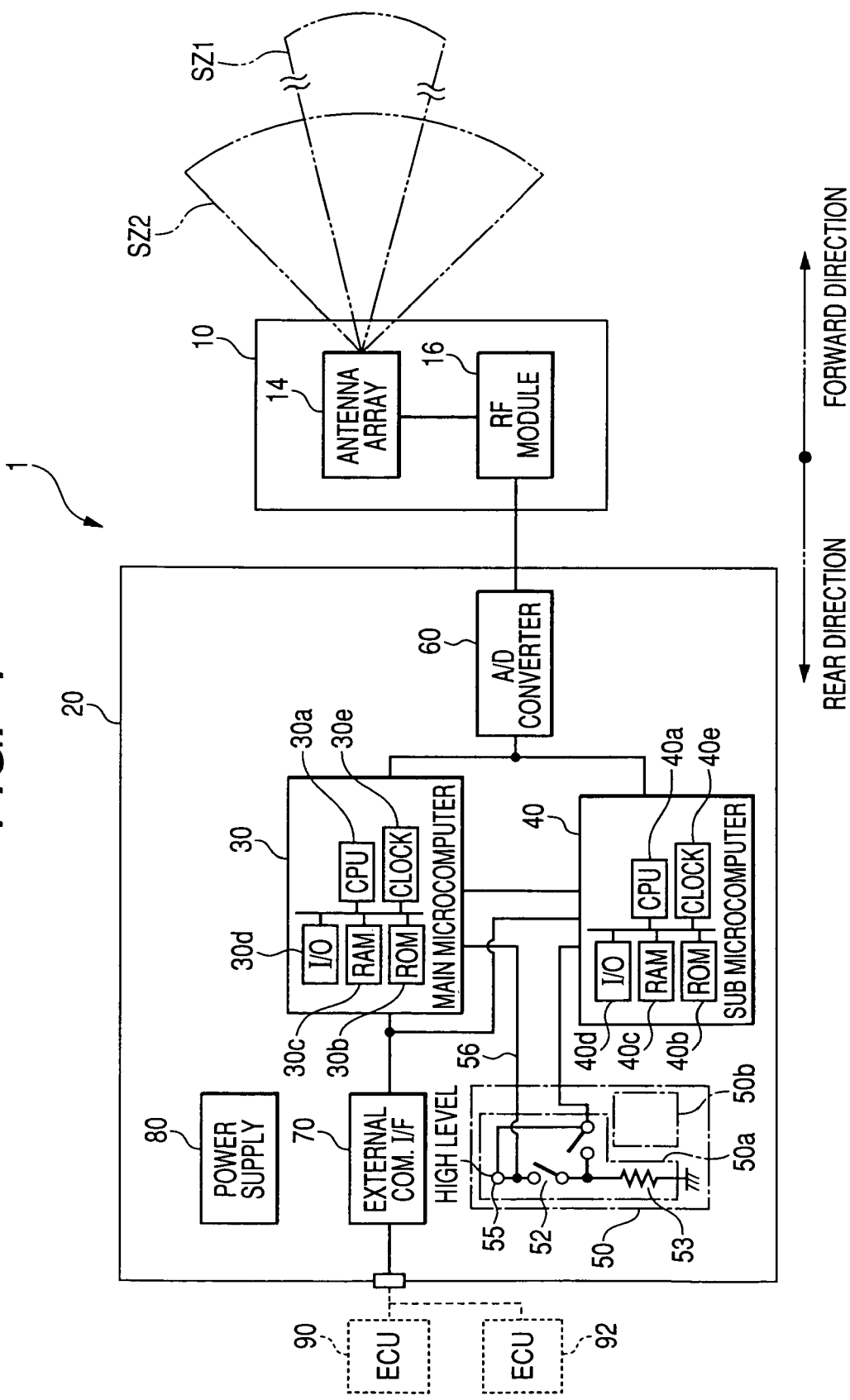
FIG. 1 is a block diagram schematically illustrating an example of the functional structure of a radar system according to a first embodiment of the present invention.

Embodiments of the present invention will be described hereinafter with reference to the accompanying drawings. In the drawings, identical reference characters are utilized to identify identical corresponding components.

First Embodiment

Referring to FIGS. 1 and 2, there is illustrated a radar system 1 according to a first embodiment of the present invention. In the first embodiments as an example of radar systems, an FMCW (Frequency-Modulated Continuous Wave) radar system is used.

The radar system 1 is installed beforehand in a motor vehicle, referred to simply as vehicle.

Specifically, the radar system 1 is equipped with a transceiver 10, a shield plate 18, a control circuit 20, a radome (front housing) 12, a rear housing 22, and a connector 24; these components are integrated with each other (see FIG. 2).

Each of the transceiver 10, the shield plate 18, and the control circuit 20 has a substantially plate-like shape, and they are laminated in their thickness directions to be bolted up as a circuit module. The radome 12 is attached to the front side (signal-transmitting side) of the integrated circuit module, and the rear housing 22 is attached to the rear side thereof. The radome 12 and the rear housing 22 are bolted so that the radar system 1 is assembled.

For example, the radar assembly 1 can be mounted onto the back of a grille located at the front of the vehicle or mounted to be embedded in a bumper at the front end of the vehicle.

To the control circuit 20, an adaptive cruise control ECU 90 and a pre-crash safety ECU 92 installed in the vehicle are communicably connected via, for example, the connector 24. The adaptive cruise control ECU 90 and the pre-crash safety ECU 92 are examples of vehicle operating condition controllers installed in the vehicle.

The transceiver 10 is operative to transmit and receive a frequency-modulated radio wave in the millimeter wave band.

Specifically, as illustrated in FIG. 2, the transceiver 10 is provided with an antenna array 14 and an RF (Radio Frequency) module 16. For example, the antenna array 14 consists of a single transmitting antenna and a plurality of receiving antennas arranged in array.

The RF module 16 is connected to each of the transmitting antenna and the receiving antennas and to the control circuit 20.

The RF module 16 is operative to:

generate a carrier wave in a millimeter waveband, such as 76 GHz band;

modulate the carrier wave by the first baseband signal with, for example, 100 MHz for long distance targets to thereby produce a first millimeter wave whose frequency is linearly changed in a positive sense and a negative sense;

modulate the carrier wave by the second baseband signal with, for example, 300 MHz for close distance targets to thereby produce a second millimeter wave whose frequency is linearly changed in a positive sense and a negative sense;

radiate the positively and negatively chirped second millimeter wave through the transmitting antenna of the antenna array 14 so as to scan the second millimeter wave over a predetermined near scan zone SZ2 (see FIG. 1) in front of the vehicle; and radiate the positively and negatively chirped first millimeter wave through the transmitting antenna of the antenna array 14 so as to scan the first millimeter wave over a predetermined far scan zone SZ1 (see FIG. 1) in front of the vehicle beyond the near scan zone SZ2 in the forward direction.

The RF module 16 is also operative to:

receive, via the plurality of receiving antennas of the antenna array 14, echo signals based on each of the radiated first and second millimeter waves;

mix a portion of the transmitted first millimeter wave with each of the returned echo signals based on the transmitted first millimeter wave, thus producing a first beat signal whose frequency corresponds to the difference in frequency between the transmitted first millimeter wave and each of the returned echo signals;

mix a portion of the transmitted second millimeter wave with each of the returned echo signals based on the transmitted second millimeter wave, thus producing a second beat signal whose frequency corresponds to the difference in frequency between the transmitted second millimeter wave and each of the returned echo signals; and send, to the control circuit 20, the produced first and second beat signals. Note that the frequency difference will be referred to as "beat frequency".

The control circuit 20 consists of a main microcomputer 30, a sub microcomputer 40, a computer-operation control unit 50, an analog-to-digital (A/D) converter 60, an external communication interface (I/F) 70, and a power supply 80. The components 30, 40, 50, 60, and 70 are connected to the power supply 80 to be energized thereby. Note that the connections between the components and the power supply 80 are omitted in illustration in FIG. 1 for the sake of simplicity.

The A/D converter 60 is connected to the RF module 16, the main microcomputer 30, and the sub microcomputer 40.

The A/D converter 60 is operative to:

convert the first beat signals sent from the RF module 16 into digital first beat signals;

convert the second beat signals sent from the RF module 16 into digital second beat signals;

send, to the main microcomputer 30, the converted digital second beat signal; and send, to the sub microcomputer 40, the converted digital first beat signals.

The main microcomputer 30 is connected to the RF module 16, the sub microcomputer 40, the computer-operation control unit 50, and the external communication I/F 70.

The main microcomputer 30 consists of a CPU 30a, a flash ROM 30b, a RAM 30c, an input/output I/O) interface 30d, and a clock (clock generator) 30e; these elements 30b to 30e are connected to the CPU 30a.

The clock 30e works to generate a clock signal with a predetermined clock frequency on which the CPU 30a operates.

The CPU 30a is operative to control overall operations of the main microcomputer 30.

The flash ROM 30b is used as an example of various types of nonvolatile memories. Specifically, the flash ROM 30b has stored therein a plurality of programs. At least one of the programs causes the CPU 30a to execute various tasks including a close-distance target measuring task and a self-diagnostic task.

The RAM 30c allows the CPU 30a to quickly access itself, and allows the CPU 30a to temporarily store processed data therein.

The I/O interface 30d is operative to allow data communications between the CPU 30a and the RF module 16 and between the CPU 30a and the external communication interface I/F 70.

Specifically, a close-distance target measuring program stored in the flash ROM 30b causes the main microcomputer 30 to execute the close-distance target measuring task by:
  controlling the RF module 16 to modulate the carrier wave by the second base band signal whose frequency of 300 MHz higher than that of the first baseband signal;
  receiving the digital second beat signals based on the second millimeter wave transmitted from the RF module 16;
  computing data indicative of physical relationships between the vehicle and targets located within the near scan zone SZ2 based on the received digital second beat signals; and
  sending, as close-distance target data, the computed data to the external communication I/F 70.

For example, the physical relationships include a distance between each of the targets and the vehicle, a relative speed between the vehicle and each of the targets, and a direction of each of the targets with respect to the vehicle.

Examples of the physical-relationship computing technique has been well known in, for example, U.S. Pat. Nos. 5,731,778 and 6,097,331. Because the U.S. Pat. Nos. 5,731,778 and 6,097,331 are assigned to the same assignee as that of this application, disclosures of these patents are incorporated herein by reference.

A self-diagnostic program stored in the flash ROM 30b causes the main microcomputer 30 to execute the self-diagnostic task to thereby check, for example, whether:
  a failure occurs in the flash ROM 30b and the RAM 30c;
  CPU-runaway occurs;
  abnormal external data capture occurs;
  abnormal operations in the CPU 30a occur, and
  abnormal communications between the CPU 30a and the CPU 40a occur. The self diagnostic task will be described in detail hereinafter.

To the main microcomputer 30, a reset signal is adapted to be continuously input from the computer-operation control unit 50 described hereinafter. The main microcomputer 30 is running (active) during the reset signal having a high level, and inactive during the reset signal having a low level.

When the reset signal is turned from high to low, the main microcomputer 30 is programmed to send, to the sub microcomputer 40, an instruction to deactivate the sub microcomputer 40.

The sub microcomputer 40 is connected to the RF module 16, the computer-operation control unit 50, and the external communication I/F 70.

The sub microcomputer 40 consists of a CPU 40a, a flash ROM 40b, a RAM 40c, an I/O interface 40d, and a clock (clock generator) 40e; these elements 40b to 40e are connected to the CPU 40a.

The clock 40e works to generate a clock signal with a predetermined clock frequency on which the CPU 40a operates.

The CPU 40a is operative to control overall operations of the sub microcomputer 40.

The flash ROM 40b is used as an example of various types of nonvolatile memories. Specifically, the flash ROM 40b has stored therein a plurality of programs. At least one of the programs causes the CPU 40a to execute various tasks including a long distance measuring task and a self-diagnostic task.

The RAM 40c is operative to be quickly accessible by the CPU 40a and to store therein data processed thereby.

The RAM 40c allows the CPU 40a to quickly access itself, and allows the CPU 40a to temporarily store processed data therein.

The I/O interface 40d is operative to allow data communications between the CPU 40a and the RF module 16 and between the CPU 40a and the external communication interface I/F 70.

Specifically, a long-distance measuring program causes the sub microcomputer 40 to execute the long-distance measuring task by:
  controlling the RF module 16 to modulate the carrier wave by the first base band signal whose frequency of 100 MHz lower than that of the second baseband signal;
  receiving the digital first beat signals based on the first millimeter wave transmitted from the RF module 16;
  computing data indicative of physical relationships between the vehicle and targets located within the far scan zone SZ1 based on the received digital first beat signals in accordance with the well-known techniques; and
  sending, as long-distance target data, the computed data to the external communication I/F 70.

A self-diagnostic program stored in the flash ROM 40b causes the main microcomputer 40 to execute the self-diagnostic task to thereby check whether:
  a failure occurs in the flash ROM 40b and the RAM 40c;
  CPU-runaway occurs;
  abnormal external data capture occurs;
  abnormal operations in the CPU 40a occur; and
  abnormal communications between the CPU 30a and the CPU 40a occur. The self-diagnostic task will be described in detail hereinafter.

Like the main microcomputer 30, to the sub microcomputer 40, a reset signal is adapted to be continuously input from the computer-operation control unit 50 described hereinafter. The sub microcomputer 40 is running (active) during the entered reset signal having the high level, and inactive during the entered reset signal having the low level.

In addition, in the flash ROM 40b, the close-distance target measuring program stored in the flash ROM 30b is further stored.

Specifically, the sub microcomputer 40 is able to execute the close-distance target measuring task set forth above.

The computer-operation control unit 50 is composed of a switch circuit 50a for switching the reset signal between the high level and the low level. For example, the switch circuit 50a is provided with a first switch 52, a resistor 53, a second switch 54, and a terminal 55.

One end of the resistor 53 is connected to a signal ground of the computer-operation control unit 50, and the other end thereof is connected to one end of the first switch 52. The other end of the first switch 52 is connected to the terminal 55, and, to the terminal 55, a predetermined voltage corresponding to the high level is continuously applied from, for example, the power supply 80.

One end of the second switch 54 is connected between the one end of the first switch 52 and the other end of the resistor 53, and the other end thereof is connected to both the terminal 55 and the sub microcomputer 40. A signal line 56 is connected at its one end between the terminal 55 and the other end of the first switch 52 and at its other end to the main microcomputer 30. Each of the first and second switches 52 and 54 has a control terminal (not shown) connected to the controller 50b.

The controller 50b is operative to execute a computer-task control process in accordance with a computer-task control program stored therein by:

controlling the first switch 52 via its control terminal so as to be on or off; and controlling the second switch 54 via its control terminal so as to be on or off.

The on state of the first switch 52 allows the ground voltage corresponding to the low level to be applied as the reset signal to the main microcomputer 30; this results that the main microcomputer 30 is inactive. In contrast, the off state of the first switch 52 allows the predetermined voltage corresponding to the high level to be applied as the reset signal to the main microcomputer 30; this results that the main microcomputer 30 is active.

The on state of the second switch 54 allows the ground voltage corresponding to the low level to be applied as the reset signal to the sub microcomputer 40; this results that the sub microcomputer 40 is inactive.

In contrast, the off state of the second switch 54 allows the predetermined voltage corresponding to the high level to be applied as the reset signal to the sub microcomputer 40; this results that the sub microcomputer 40 is active.

The controller 50b is configured to communicate with both the CPU 30a of the main microcomputer 30 and the CPU 40a of the sub microcomputer 40. Note that the connections between the controller 50b and each of the CPUs 30a and 40a are omitted in illustration in FIG. 1 for the sake of simplicity.

The external communication I/F 70 is operative to receive the close-distance target data sent from the main microcomputer 30 and the long-distance target data sent from the sub microcomputer 40, and to send, to each of the adaptive cruise control ECU 90 and the pre-crash safety ECU 92, the received close-distance target data and the long distance target data.

The adaptive cruise control ECU 90 is operative to alter, based on the long-distance target data, the vehicle speed to maintain a desired interval with respect to a leading vehicle while following the leading vehicle when there is the leading vehicle in front of the vehicle as a target.

The pre-crash safety ECU 92 is operative to execute operations required for pre-crash safety. Specifically, the pre-crash safety ECU 92 is operative to provide, based on the close-distance target data, braking assist and seatbelt retraction, and prompt the driver to take action to avoid a collision and reduce damage when it is determined that the vehicle will collide with a target.

Next, operations of the main microcomputer 30 and sub microcomputer 40 during the vehicle being running will be described hereinafter with reference to FIGS. 3 and 6.

Figure 3:
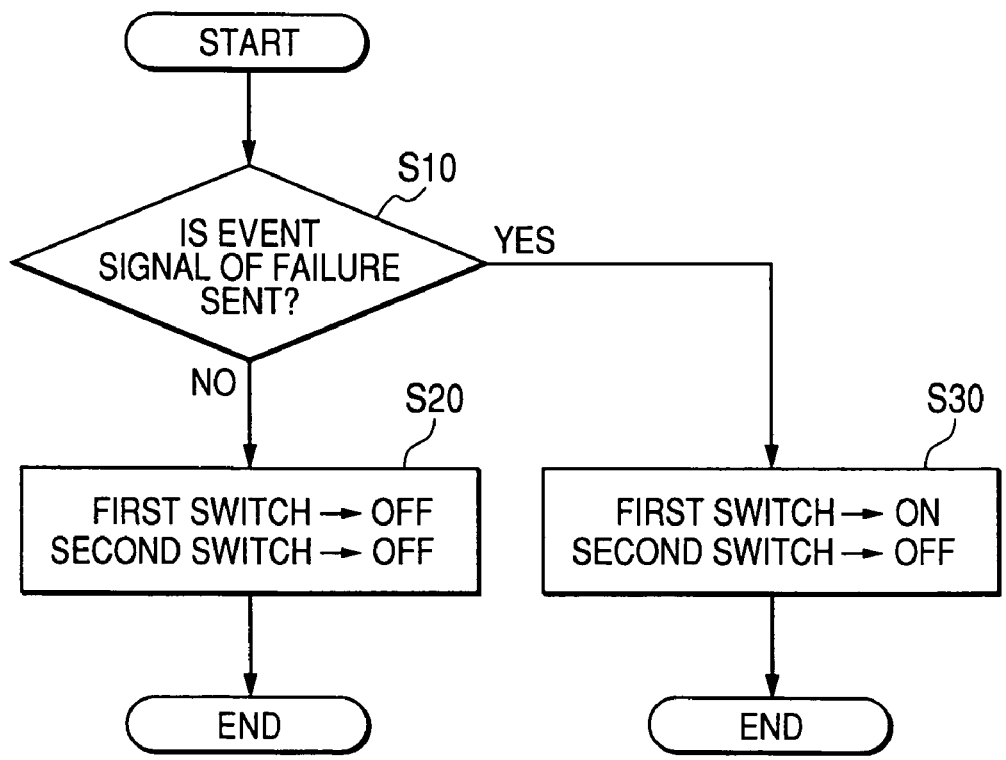
FIG. 3 is a flowchart schematically illustrating a computer-task control process to be executed by a controller of a computer-operation control unit illustrated in FIG. 1.

FIG. 3 schematically illustrates a computer-task control process to be executed by the controller 50b of the computer-operation control unit 50 at, for example, regular intervals.

Figure 4:
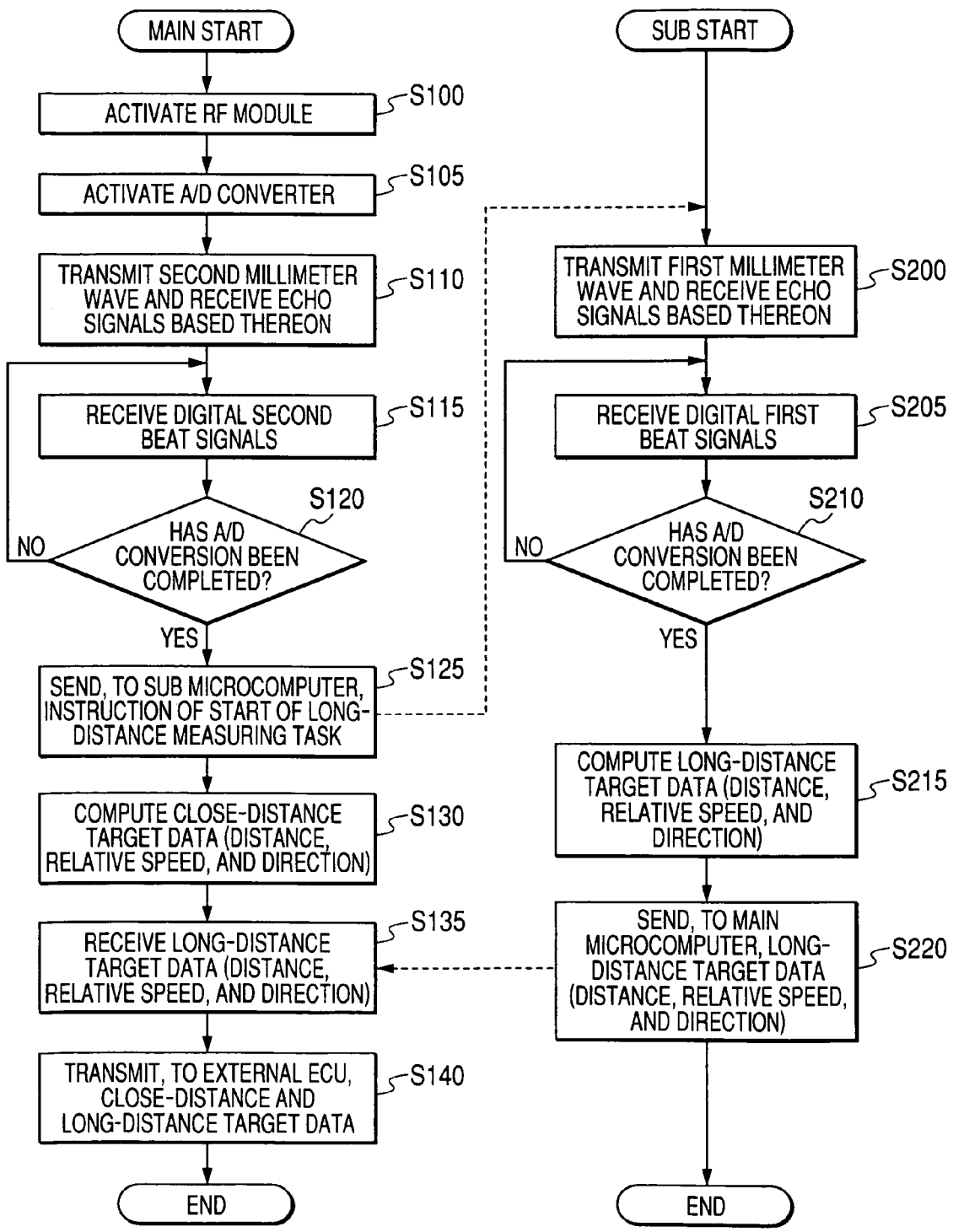
FIG. 4 is a flowchart schematically illustrating close-distance and long-distance target measuring tasks to be executed by main and sub microcomputers in a normal mode illustrated in FIG. 1.

FIG. 4 schematically illustrates the close-distance target measuring task to be repeatedly executed by the main microcomputer 30 at, for example, regular intervals while the main microcomputer 30 operates in the normal mode. FIG. 4 also schematically illustrates the long-distance target measuring task to be repeatedly executed by the sub microcomputer 40 at, for example, regular intervals while the sub microcomputer 40 operates in the normal mode.

Note that the close-distance target measuring task and the long-distance target measuring task are executed by the respective main microcomputer 30 and the sub microcomputer 40 in synchronization with each other on the basis of computer-to-computer communications. For this reason, in order to facilitate understanding of the close-distance target measuring task and the long-distance target measuring task, they are collectively illustrated in the single figure (FIG. 3).

In addition, note that the normal mode represents the operating state of each of the microcomputers 30 and 40 in which no failures and malfunctions occur in the computers 30 and 40.

When launching the computer-task control program, the controller 50b determines whether an event signal indicative of occurrence of failures is sent from at least one of the main microcomputer 30 and the sub microcomputer 40 in step S10 of FIG. 3.

When it is determined no event signals indicative of occurrence of failures are sent from both the main microcomputer 30 and the sub microcomputer 40 (the determination in step S10 is YES), the controller 50b proceeds to step S20.

In step S20, the controller 50b controls the first switch 52 to be off, and controls the second switch 54 to be off. This allows the reset signal with the high level to be sent to each of the main and sub microcomputers 30 and 40 from the switch circuit 50a, whereby the main microcomputer 30 and the sub microcomputer 40 are active in the normal mode.

In the normal mode, when launching the close-distance target measuring task, the microcomputer 30 (the CPU 30a) activates the RF module 16 in step S100 of FIG. 4, and activates the A/D converter 60 in step S105.

Next, the main microcomputer 30 drives the RF module 16 to transmit the second millimeter wave so as to scan the predetermined near scan zone SZ2, and to receive echo signals generated based on the second millimeter wave in step S110.

Specifically, under control of the main microcomputer 30, the RF module 16 generates the carrier wave in the 76 GHz band, and modulates the generated carrier wave by the second base band signal whose frequency of 300 MHz, thus producing the second millimeter wave. The RF module 16 scans the second millimeter wave over the near scan zone SZ2.

When echo signals generated by reflection of the second millimeter wave by at least one target (second target) located within the near scan zone SZ2 are received by the antenna array 14, the RF module 16 produces a second beat signal whose frequency corresponds to the difference in frequency between the transmitted second millimeter wave and each of the returned echo signals.

The second beat signals are converted into the digital second beat signals by the A/D converter 60, and the digital second beast signals are sent to the main microcomputer 30.

When the A/D conversion by the A/D converter 60 based on the second beat signals sent from the RF module 16 has been completed, an A/D conversion complete signal is adapted to be sent from the A/D converter 60 to the main microcomputer 30.

Then, the main microcomputer 30 receives the digital second beat signals sent from the A/D converter 60 in step S115.

In parallel with the operation in step S115, the main microcomputer 30 determines whether the A/D conversion by the A/D converter 60 has been completed in step S120.

When the A/D conversion complete signal is not sent from the A/D converter 60 to the main microcomputer 30, it is determined that the A/D conversion has not been completed yet (the determination in step S120 is NO). Thus, the main microcomputer 30 returns to step S115, and continues the receipt of the digital second beat signals.

Otherwise, when the A/D conversion complete signal is sent from the A/D converter 60 to the main microcomputer 30, it is determined that the A/D conversion has been completed (the determination in step S120 is YES). Then, the main microcomputer 30 proceeds to step S125.

In step S125, the main microcomputer 30 sends, to the sub microcomputer 40, an instruction indicative of the start of long-distance target measuring task.

Next, the main microcomputer 30 computes close-distance target data based on the received digital second beat signals in step S130. The close-distance target data includes a distance between the at least one second target and the vehicle, a relative speed between the vehicle and the at least one second target, and a direction of the at least one second target with respect to the vehicle.

Thereafter, the main microcomputer 30 stands by for long-distance target data to be sent from the sub microcomputer 40 in step S135.

When the long-distance target data is sent from the sub microcomputer 40 to the main microcomputer 30, the main microcomputer 30 receives the long-distance target data in step S135, going to step S140.

In step S140, the main microcomputer 30 sends, to the ECUs 90 and 92 via the external communication I/F 70, the close-distance target data and the long-distance target data for the ACC and the PCS control, and thereafter, exiting the close-distance target measuring task.

On the other hand, in response to receiving the instruction indicative of the start of long-distance target measuring task sent from the main microcomputer 30, the sub microcomputer 40 drives the RF module 16 to transmit the first millimeter wave to thereby scan the far scan zone SZ1 in step S200. In step S200, the sub microcomputer 40 drives the RF module 16 to receive echo signals generated based on the first millimeter wave.

Specifically, under control of the sub microcomputer 40, the RF module 16 generates the carrier wave in the 76 GHz band, and modulates the generated carrier wave by the first base band signal whose frequency of 100 MHz, thus producing the first millimeter wave. The RF module 16 scans the first millimeter wave over the far scan zone SZ1.

When echo signals generated by reflection of the first millimeter wave by at least one target (first target) located within the far scan zone SZ1 are received by the antenna array 14, the RF module 16 produces a first beat signal whose frequency corresponds to the difference in frequency between the transmitted first millimeter wave and each of the returned echo signals.

The first beat signals are converted into the digital second beat signals by the A/D converter 60, and the digital first beast signals are sent to the sub microcomputer 40.

When the A/D conversion by the A/D converter 60 based on the first beat signals sent from the RF module 16 has been completed, the A/D conversion complete signal is adapted to be sent from the A/D converter 60 to the sub microcomputer 40.

Then, the sub microcomputer 40 receives the digital first beat signals sent from the A/D converter 60 in step S205.

In parallel with the operation in step S205, the sub microcomputer 40 determines whether the A/D conversion by the A/D converter 60 has been completed in step S210.

When the A/D conversion complete signal is not sent from the A/D converter 60 to the sub microcomputer 40, it is determined that the A/D conversion has not been completed yet (the determination in step S210 is NO). Thus, the sub microcomputer 40 returns to step S205, and continues the receipt of the digital first beat signals.

Otherwise, when the A/D conversion complete signal is sent from the A/D converter 60 to the sub microcomputer 40, it is determined that the A/D conversion has been completed (the determination in step S210 is YES). Then, the sub microcomputer 40 proceeds to step S215.

In step S215, the sub microcomputer 40 computes long-distance target data based on the received digital first beat signals in step S215. The long-distance target data includes a distance between the at least one first target and the vehicle, a relative speed between the vehicle and the at least one first target, and a direction of the at least one first target with respect to the vehicle.

Thereafter, in step S220, the sub microcomputer 40 sends, to the main microcomputer 30, the long-distance target data, and thereafter, exiting the long-distance target measuring task.

Returning to step S10 in FIG. 3, when it is determined an event signal indicative of occurrence of failures is sent from, for example, the main microcomputer 30 (the determination in step S10 is NO), the controller 50b proceeds to step S30.

In step S30, the controller 50b controls the first switch 52 to be on while keeping the second switch 54 in the off state. This allows the reset signal with the low level to be sent to the main microcomputer 30 while the reset signal with the high level is continuously sent to the sub microcomputer 40, whereby the sub microcomputer 40 is continuously active in the normal mode, and the main microcomputer 30 is inactive in an abnormal mode.

Figure 5:
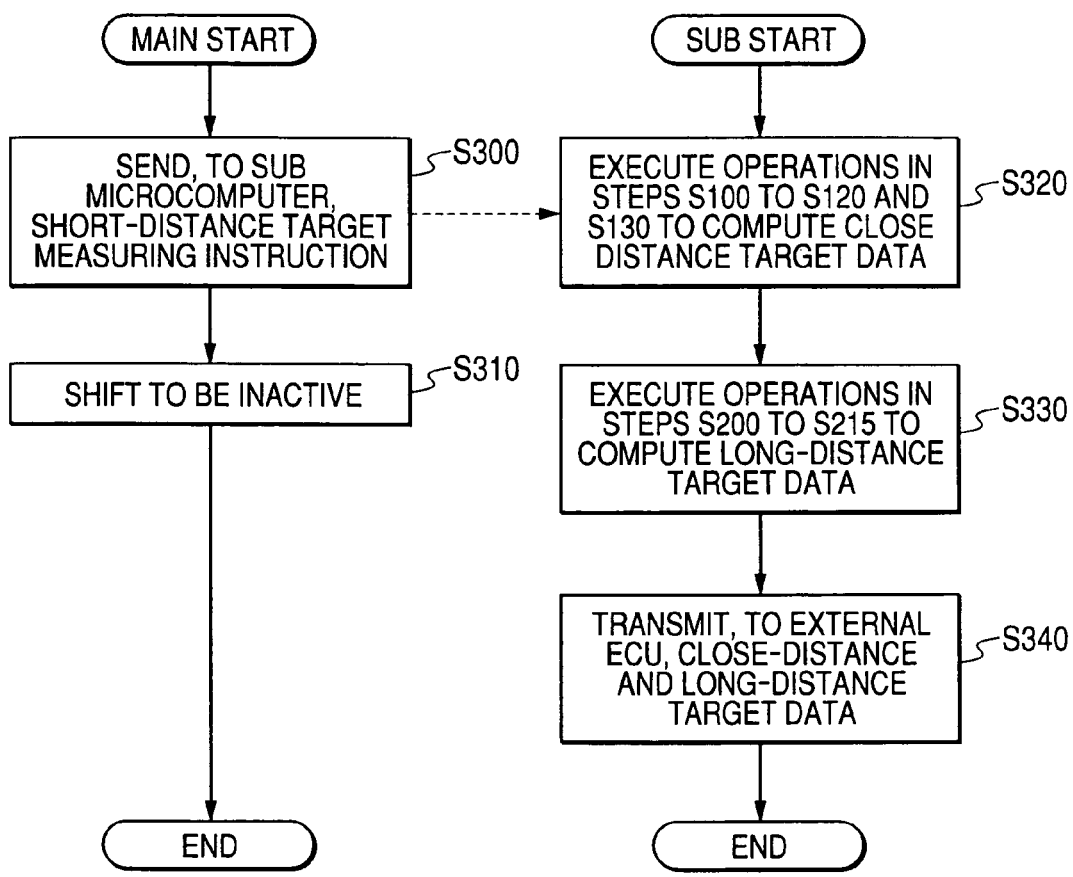
FIG. 5 is a flowchart schematically illustrating the close-distance and long-distance target measuring tasks to be executed by the sub microcomputer when the main microcomputer is shifted to be inactive.

When the reset signal is turned from the high level to the low level, the main microcomputer 30 sends, to the sub microcomputer 40, a close-distance target measuring instruction in step S300 of FIG. 5, and thereafter, shifts to be inactive in the abnormal mode in step S310.

When receiving the close-distance target measuring instruction, the sub microcomputer 40 executes a long and close-distance target measuring task illustrated in FIG. 5 in accordance with a long and close-distance target measuring program previously stored in the flash ROM 40b.

Specifically, the sub microcomputer 40 executes the operations in steps S100 to S120 and S130 illustrated in FIG. 4 to thereby compute the close-distance target data in step S320.

Subsequently, the sub microcomputer 40 executes the operations in steps S200 to S215 illustrated in FIG. 4 to thereby compute the long-distance target data in step S330.

Thereafter, in step S340, the sub microcomputer 40 sends, to the ECUs 90 and 92 via the external communication I/F 70, the close-distance target data and the long-distance target data for the ACC and the PCS control as well as the operation in step S140, and thereafter, exiting the long and close-distance target measuring task.

Next, the self diagnostic task to be executed by the main microcomputer 30 in accordance with its self-diagnostic program will be described hereinafter with reference to FIG. 6. Because the self-diagnostic task to be executed by the sub microcomputer 40 is substantially the same as that to be executed by the main microcomputer 30, it is omitted in description and illustration.

The self-diagnostic task is programmed to be repeatedly executed by each of the main and sub microcomputers 30 and 40.

When launching the self diagnostic program, the self-diagnostic program checks whether a failure occurs in the CPU 30a in step S400.

Specifically, in step S400, the self-diagnostic program instructs the CPU 30a to execute predetermined additions and/or predetermined multiplications and checks whether the results of the predetermined additions and/or predetermined multiplications are correct.

As one example, the self-diagnostic program instructs the CPU 30a to compute the sum of 1 (decimal) and 1 (decimal) and checks whether the result of the addition is equal to 2 (decimal).

As another example, the self-diagnostic program instructs the CPU 30a to compute the multiplication of 2 (decimal) and 2 (decimal) and checks whether the result of the multiplication is equal to 4 (decimal).

As a further example, the self-diagnostic program instructs the CPU 30a to compute the sum of 1.01 (decimal) and 0.99 (decimal) and checks whether the result of the addition is equal to 2.00 (decimal).

When it is determined that all of the results of the predetermined additions and/or predetermined multiplications are correct, the self-diagnostic program determines that the CPU 30a normally operates.

Otherwise, when it is determined that at least one of the results of the predetermined additions and/or predetermined multiplications is in correct, the self-diagnostic program determines that a failure occurs in the CPU 30a.

Next, the self-diagnostic program checks whether a failure occurs in the ROM 30b in step S405.

Specifically, in the first embodiment, predetermined data values have been stored in predetermined addresses of the ROM 30b.

Thus, in step S405, the self-diagnostic program instructs the CPU 30a to read actual values stored in the predetermined addresses of the ROM 30b and check whether at least one of the readout values is mismatched with a corresponding at least one of the predetermined data values.

When it is determined that no readout values are mismatched with corresponding the predetermined data values, respectively, the self-diagnostic program determines that no failures occur in the ROM 30b.

Otherwise, when it is determined that at least one of the readout values is mismatched with a corresponding at least one of the predetermined data values, the self-diagnostic program determines that a failure occurs in the ROM 30b.

Next, in step S410, the self-diagnostic program checks whether a failure occurs in the RAM 30c.

Specifically, in step S405, the self-diagnostic program instructs the CPU 30a to check whether the sum of bits of an actual value (binary digit) stored in an address of the RAM 30c including a parity bit (even parity bit or odd parity bit) added to the actual value is matched with even (even parity bit) or odd (odd parity bit).

When it is determined that the sum of bits of the actual value (binary digit) stored in the address of the RAM 30c is matched with even (even parity bit) or odd (odd parity bit), the self-diagnostic program determines that no failures occur in the RAM 30c.

Otherwise, when it is determined that the sum of bits of the actual value (binary digit) stored in the address of the RAM 30c is mismatched with even (even parity bit) or odd (odd parity bit), the self-diagnostic program determines that a failure occurs in the RAM 30c.

Next, in step S415, the self-diagnostic program checks whether abnormal communications between the CPU 30a and the CPU 40a occur.

Specifically, in step S415, the self-diagnostic program instructs the CPU 30a to:

send and receive, to and from the CPU 40a, a predetermined binary digit; and check whether the sent binary digit is matched with the received binary digit.

When it is determined that the sent binary digit is matched with the received binary digit, the self-diagnostic program determines that communications between the CPU 30a and the CPU 40a are normally executed.

Otherwise, when it is determined that the sent binary digit is mismatched with the received binary digit, the self-diagnostic program determines that abnormal communications between the CPU 30a and the CPU 40a occur.

In step S420, the self-diagnostic program determines whether the determination in each of steps S400, S405, S410, and S415 represents a failure (abnormal).

When it is determined that the determination in each of steps S400, S405, S410, and S415 represents no failures (normal) (the determination in step S420 is NO), the self diagnostic program terminates the self-diagnostic task.

Otherwise, when it is determined that the determination in at least one of steps S400, S405, S410, and S415 represents a failure (abnormal) (the determination in step S420 is YES), the self-diagnostic program sends, to the controller 50b, the event signal indicative of occurrence of failures in step S425.

As described above, in the radar system 1 according to the first embodiment during the vehicle being running, the sub microcomputer 40 computes the long-distance target data based on the digital first beat signals obtained by transmitting the first millimeter wave over the far scan zone SZ1. In parallel to the long-distance target data computing, the main microcomputer 30 computes the close-distance target data based on the digital second beat signals obtained by transmitting the second millimeter wave over the near scan zone SZ2.

In addition, as described above, the far scan zone SZ1 extends in the forward direction (traveling direction) beyond the near scan zone SZ2.

Let us assume, as a first object, a leading vehicle is located within the far scan zone SZ1, and a second object is located within the near scan zone SZ2.

In this assumption, as the long-distance target data, the distance between the vehicle and the leading vehicle, the relative speed between the vehicle and the leading vehicle, and the direction of the leading vehicle with respect to the vehicle can be measured by the sub microcomputer 40.

Similarly, as the close-distance target data, the distance between the vehicle and the second object, the relative speed between the vehicle and the second object, and the direction of the second object with respect to the vehicle can be measured by the sub microcomputer 40.

The long-distance target data allows the adaptive cruise control ECU 90 to alter the vehicle speed to maintain a desired interval with respect to the leading vehicle while following the leading vehicle, thus maintaining driving comfort at a high level.

The close-distance target data allows the pre-crash safety ECU 92 to provide braking assist and seatbelt retraction, and prompt the driver to take action to avoid a collision and reduce damage when it is determined that the vehicle will collide with the second object, thus maintaining driving safety at a high level.

Note that, in the first embodiment, the radar system 1 is mounted on an outer surface of the vehicle body, such as the back of the grille located at the front of the vehicle body or mounted to be embedded in a bumper at the front end of the vehicle body.

This causes the radar assembly 1 to be exposed to environmental changes. For example, under the scorching sun in the summer season, the radar assembly 1 may be exposed to a high-temperature environment, and in the winter season, it may be exposed to a low-temperature environment. In addition, during the vehicle being running, the radar assembly 1 is subjected to random oscillations.

Accordingly, the environmental changes to which the radar system 1 are exposed over the years may cause a failure of the main microcomputer 30 or the sub microcomputer 40.

However, in the radar system 1, even if a failure occurs in a part of the main microcomputer 30, the sub microcomputer 40 is programmed to execute the close-distance target measuring task to thereby continuously obtain the close-distance target data.

Specifically, even if the close-distance target measuring task cannot be executed by the main microcomputer 30 due to the event of malfunction in the main microcomputer 30, the sub microcomputer 40 serves as the alternative to the main microcomputer 30 so as to continuously obtain the close-distance target data.

Thus, it is possible for the pre-crash safety control ECU 92 to continuously execute the operations required for the pre-crash safety even if the main microcomputer 30 abnormally operates, thus keeping driving safety at a more high level.

Second Embodiment

In the first embodiment, when a failure occurs in a part of the main microcomputer 30, the computer-operation control unit 50 is designed to change the level of the reset signal to be sent to the main microcomputer 30 from the high level to the low level to thereby deactivate the main microcomputer 30.

A radar system 1A according to a second embodiment of the present invention has a main-microcomputer deactivating structure different from the radar system 1 according to the first embodiment.

Figure 7:
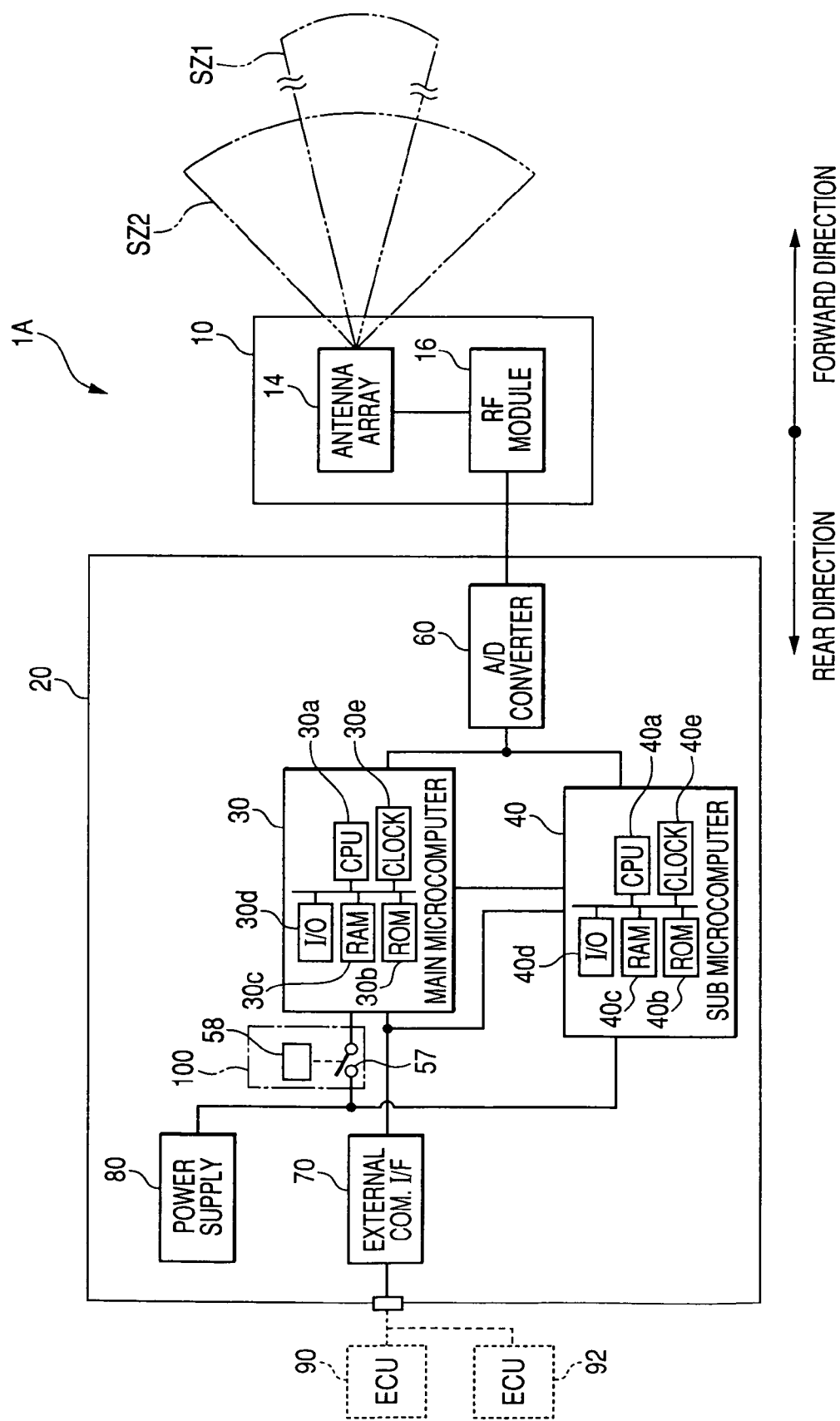
FIG. 7 is a block diagram schematically illustrating an example of the functional structure of a radar system according to a second embodiment of the present invention.

Specifically, as illustrated in FIG. 7, the control circuit 20 includes a computer-operation control unit 100 in place of the computer-operation control unit 50. The computer-operation control unit 100 is equipped with a power on/off switch 57 and a controller 58. One end of the power on/off switch 57 is connected to a power supply line between the power supply 80 and the sub microcomputer 40, and the other end thereof is connected to the main microcomputer 30.

The power on/off switch 57 has a control terminal (not shown) connected to the controller 58 connected to the CPU 30a of the microcomputer 30.

With the power supply structure, while the power on/of switch 57 is in on state, the power output from the power supply 80 is supplied to the main microcomputer 30 via the power on/off switch 57 so that the power supply 80 is energized.

The controller 58 is programmed to control the power on/off switch 57 via its control terminal to be off when it is determined that an event signal indicative of occurrence of failures is sent from the main microcomputer 30 (see step S30 in FIG. 3). This allows the supply of the output power from the power supply 80 to be interrupted, resulting that the main microcomputer 30 is shifted to be inactive.

The remaining structure of the radar system 1A except for the power supply structure is substantially identical to the corresponding structure of the radar system 1, and therefore, descriptions thereof are omitted.

As described above, the radar system 1A is configured to interrupt the supply of the output power from the power supply 80 in the event of failure in the main microcomputer 30. This allows the main microcomputer 30 to be reliably deactivated in the event of failure therein. Thus, it is possible to prevent the faulty main microcomputer 30 from computing the close-distance target data and from sending the close-distance target data to the ECUs 90 and 92, to thereby maintain driving safety at a furthermore high level.

Third Embodiment

In the second embodiment, when a failure occurs in a part of the main microcomputer 30, the controller 58 of the computer-operation control unit 100 is configured to interrupt the supply of the output power from the power supply 80 to the main microcomputer 30 to thereby deactivate the main microcomputer 30.

A radar system 1B according to a third embodiment of the present invention has a main-microcomputer deactivating structure different from the radar system 1 according to the first embodiment.

Figure 8:
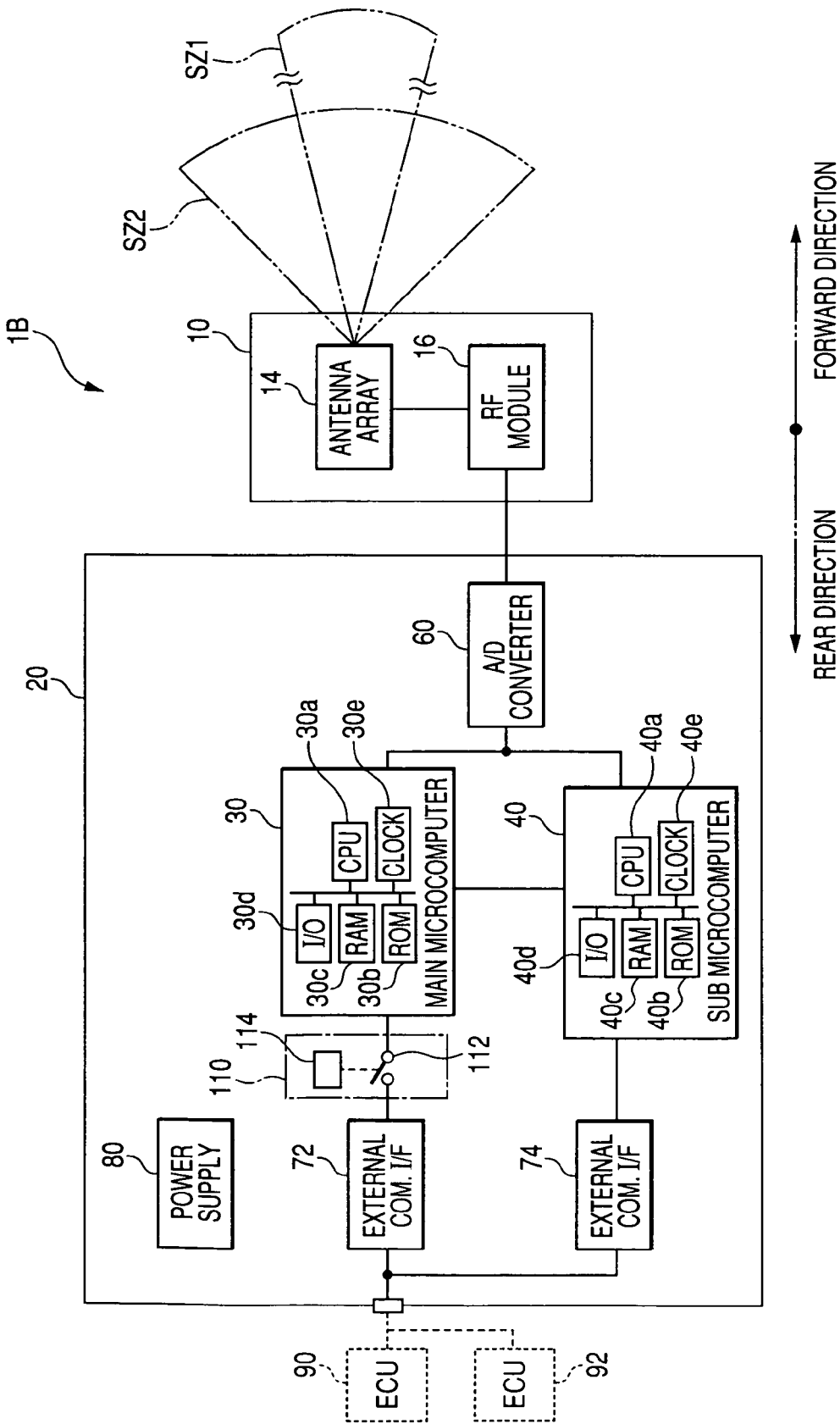
FIG. 8 is a block diagram schematically illustrating an example of the functional structure of a radar system according to a third embodiment of the present invention.

Specifically, as illustrated in FIG. 8, the control circuit 20 includes a first external communication I/F 72 and a second external communication I/F 74.

The first external communication I/F 72 is connected to the main microcomputer 30 and operative to receive the close-distance target data sent from the main microcomputer 30 and to send, to each of the adaptive cruise control ECU 90 and the pre-crash safety ECU 92, the received close-distance target data.

The second external communication I/F 74 is connected to the sub microcomputer 40 and operative to receive the long-distance target data sent from the sub microcomputer 40 and to send, to each of the adaptive cruise control ECU 90 and the pre-crash safety ECU 92, the received long-distance target data.

The control circuit 20 also includes a computer-operation control unit 110 in place of the computer-operation control unit 50. The computer-operation control unit 110 is equipped with a switch 112 and a controller 114. The switch 112 is connected between the main microcomputer 30 and the first external communication I/F 72.

The switch 112 has a control terminal (not shown) connected to the controller 114.

The controller 114 is programmed to control the switch 112 via its control terminal to be off when it is determined that an event signal indicative of occurrence of failures is sent from the main microcomputer 30 (see step S30 in FIG. 3). This can prevent faulty close-distance target data computed by the faulty main microcomputer 30 from being transmitted therefrom to the first external communication I/F 72 via the switch 112.

The remaining structure of the radar system 1B is substantially identical to the corresponding structure of the radar system 1, and therefore, descriptions thereof are omitted.

As described above, the radar system 1B is configured to, in the main microcomputer 30, prevent faulty close-distance target data computed by the faulty main microcomputer 30 from being transmitted therefrom to the first external communication I/F 72 via the switch 112.

This allows the normal sub microcomputer 40 to:
compute both the close-distance target data and the long-distance target data; and
transmit the computed long-distance target data and the computed close-distance target data to the first external communication I/F 72 and the second external communication I/F 74, respectively.

Thus, it is possible to maintain driving safety at a still furthermore high level.

The first to third embodiments according to the present invention have been described, but the present invention is not limited to these embodiments.

Specifically, in the first embodiment, when a failure occurs in a part of the main microcomputer 30, the computer-operation control unit 50 is designed to change the level of the reset signal to be sent to the main microcomputer 30 from the high level to the low level to thereby deactivate the main microcomputer 30. However, the present invention is not limited to the structure.

The computer-operation control unit 50 can be configured to disable the main microcomputer 30 to:

compute the close-distance target data or output the close-distance target; data from the main microcomputer 30.

For example, the computer-operation control unit 50 can be configured to deactivate the clock 30e of the main microcomputer 30 or deactivate the I/O interface 36.

In addition, in each of the first to third embodiments, when a failure occurs in a part of the main microcomputer 30, the sub microcomputer 40 serves the alternative to the main microcomputer 30 so as to continuously obtain the close-distance target data. The present invention is however not limited to the structure.

Figure 6:
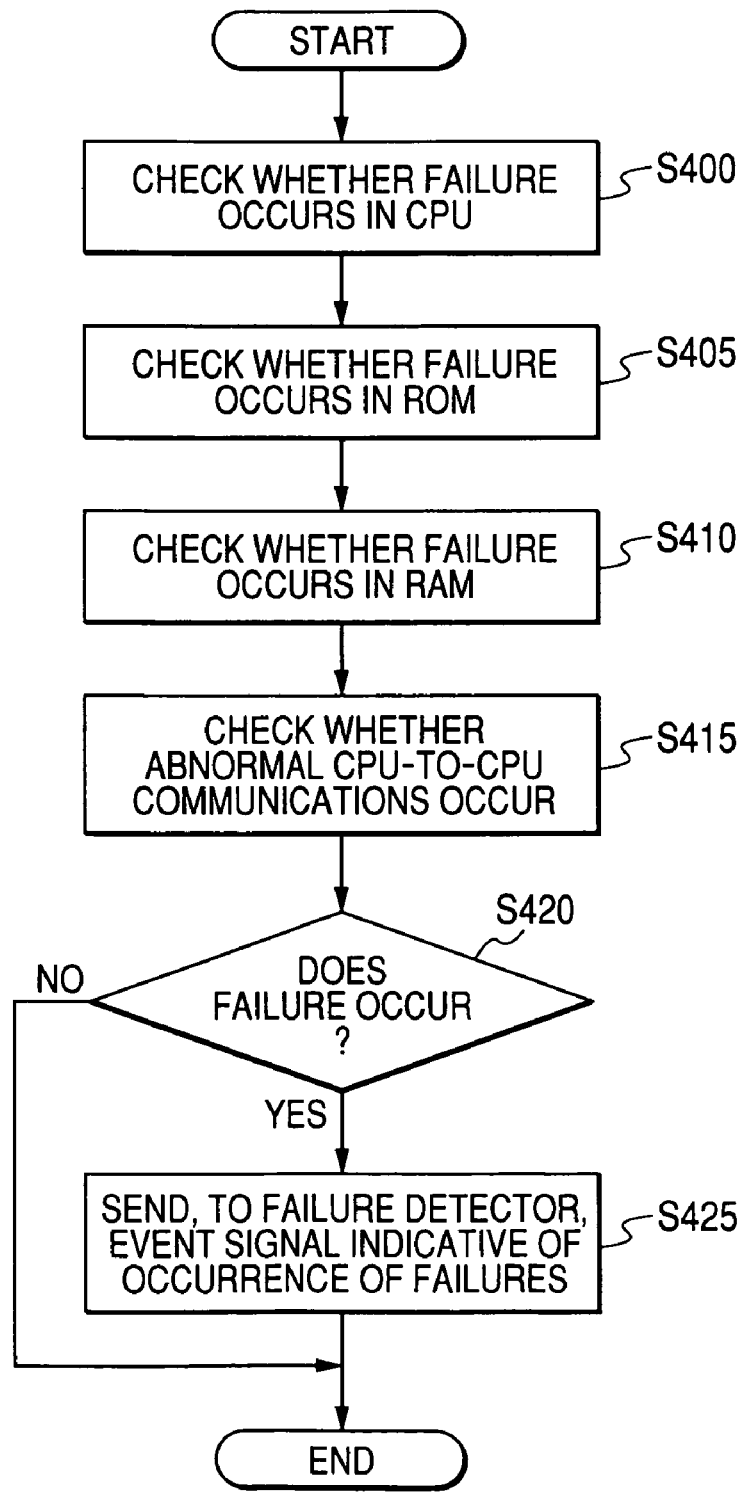
FIG. 6 is a flowchart schematically illustrating a self-diagnostic task to be executed by the main microcomputer.

Specifically, when it is determined that a failure occurs in a part of the sub microcomputer 40 (see step S420 in FIG. 6, the main microcomputer 30 can serve as the alternative to the sub microcomputer 40 so as to continuously obtain the long-distance target data.

Figure 9:
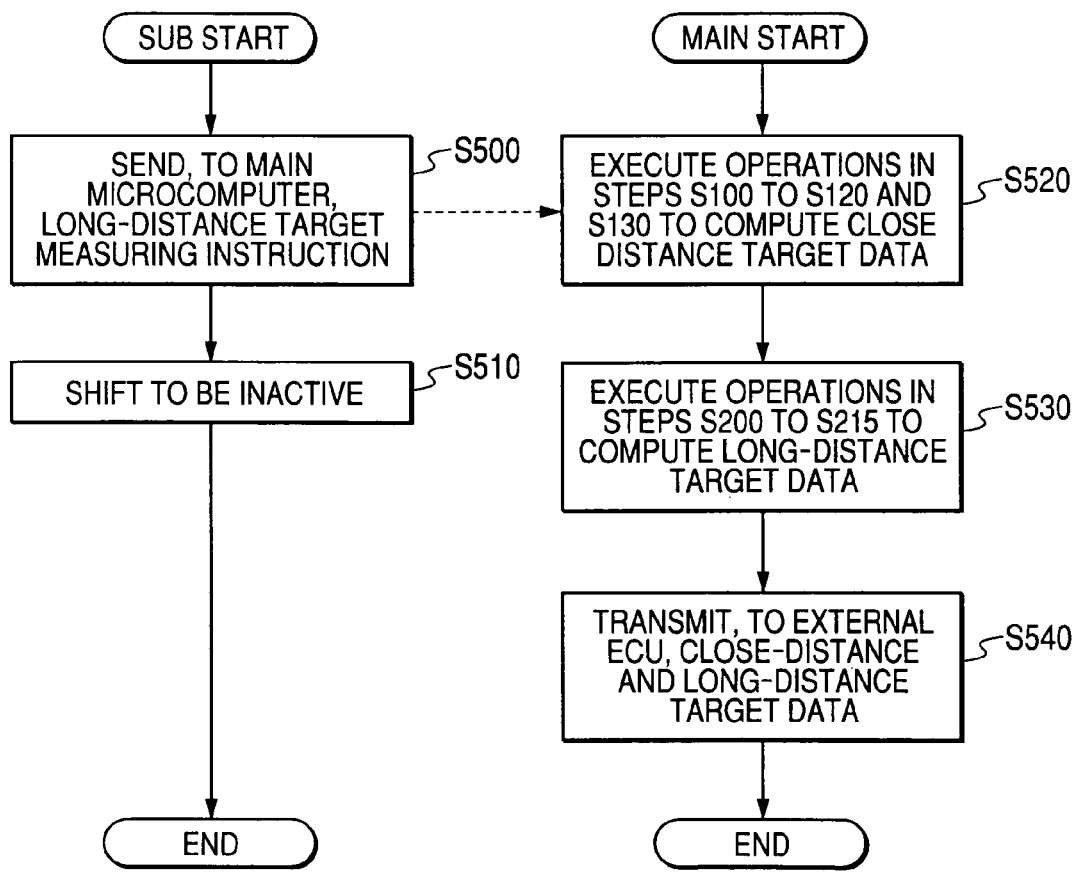
FIG. 9 is a flowchart schematically illustrating the close-distance and long-distance target measuring tasks to be executed by the main microcomputer when the sub microcomputer is shifted to be inactive.

For example, as illustrated in FIG. 9, when the reset signal is turned from the high level to the low level, the sub microcomputer 40 sends, to the main microcomputer 30, a long-distance target measuring instruction in step S500, and thereafter, shifts to be inactive in the abnormal mode in step S510.

When receiving the long-distance target measuring instruction, the main microcomputer 30 executes a long and close-distance target measuring task illustrated in FIG. 5 in accordance with a long and close-distance target measuring program previously stored in the flash ROM 30b.

Specifically, the main microcomputer 30 executes the operations in steps S100 to S120 and S130 illustrated in FIG. 4 to thereby compute the close-distance target data in step S520.

Subsequently, the main microcomputer 30 executes the operations in steps S200 to S215 illustrated in FIG. 4 to thereby compute the long-distance target data in step S530.

Thereafter, in step S540, the main microcomputer 30 sends, to the ECUs 90 and 92 via the external communication I/F 70, the close-distance target data and the long-distance target data for the ACC and the PCS control as well as the operation in step S140, and thereafter, exiting the long and close-distance target measuring task.

In the modification set forth above, even if a failure occurs in a part of the sub microcomputer 40, the main microcomputer 30 is programmed to execute the long-distance target measuring task to thereby continuously obtain the long-distance target data. Thus, it is possible for the adaptive cruise control ECU 90 to continuously execute the operations required for the adaptive cruise control even if the sub microcomputer 40 abnormally operates, thus keeping driving comfort at a more high level.

In each of the first to third embodiments and their modifications, the RF module 16 is operative to transmit each of the positively and negatively chirped first and second millimeter waves through the transmitting antenna of the antenna array 14 so as to scan it over a corresponding one of the far scan zone SZ1 and near scan zone SZ2 (see FIG. 1) in front of the vehicle. The present invention is however not limited to the structure.

Specifically, the RF module 16 can be operative to:

transmit the positively and negatively chirped first millimeter wave through the transmitting antenna of the antenna array 14 so as to scan it over a first part of a surrounding area of the vehicle; and transmit the positively and negatively chirped second millimeter wave through the transmitting antenna of the antenna array 14 so as to scan it over a second part of the surrounding area of the vehicle; this second part of the surrounding area is different from the first part thereof.

In each of the first to third embodiments and their modifications, the frequency-modulated radio wave in the millimeter wave band is used as a radio wave for monitoring at least part of the surrounding area of the vehicle, but the present invention is not limited to the usage.

Specifically, a radio wave in another wave band modulated in one of various modulation methods, such as pulse modulation or spread spectrum modulation, can be used.

While there has been described what is at present considered to be the embodiments and their modifications of the present invention, it will be understood that various modifications which are not described yet may be made therein, and it is intended to cover in the appended claims all such modifications as fall within the true spirit and scope of the invention.

What is claimed is:

1. A radar system installed in a vehicle, the radar system comprising:

a transmitter configured to:

transmit a first radio wave over a first part of a surrounding area of the vehicle;

receive a first echo signal generated by reflection of the first radio wave from a first object located within the first part of the surrounding area;

transmit a second radio wave over a second part of the surrounding area of the vehicle, the second radio wave being distinguished from the first radio wave, the second part of the surrounding area being at least partly different from the first part thereof; and receive a second echo signal generated by reflection of the second radio wave from a second object located within the second part of the surrounding area;

a first measuring unit configured to measure a first physical relationship between the vehicle and the first object based on the received first echo signal;

a second measuring unit configured to measure a second physical relationship between the vehicle and the second object based on the received second echo signal;

a failure detector operatively connected to each of the first measuring unit and the second measuring unit and configured to detect whether a failure occurs in each of the first and second measuring units; and an alternative control unit configured to, when it is detected that a failure occurs in one of the first and second measuring units, cause the other of the first and second measuring units to serve as an alternative to the one of the first and second measuring units to thereby measure a corresponding one of the first and second physical relationships.

2. A radar system according to claim 1, wherein the first radio wave is generated by modulating a carrier wave in a predetermined millimeter band by a first frequency, the second radio wave is generated by modulating the carrier wave in the predetermined millimeter band by a second frequency, the second frequency is higher than the first frequency, and the first part of the surrounding area of the vehicle extends beyond the second part thereof so that the second object is located to be closer to the vehicle than the first object.

3. A radar system according to claim 2, wherein, when it is detected that a failure occurs in the second measuring unit, the alternative control unit is configured to:
   cause the first measuring unit to serve as an alternative to the second measuring unit to thereby measure the second physical relationship; and
   deactivate the second measuring unit.

4. A radar system according to claim 2, further comprising:
   a power source that supplies power to at least the second measuring unit so as to activate the second measuring unit,
   wherein, when it is detected that a failure occurs in the second measuring unit, the alternative control unit is configured to:
   cause the first measuring unit to serve as an alternative to the second measuring unit to thereby measure the second physical relationship; and
   interrupt the supply of the power to the second measuring unit.

5. A radar system according to claim 2, further comprising:
   a first sender configured to send, to a vehicle operating condition controller, first information indicative of the first physical relationship, the vehicle operating condition controller being installed in the vehicle to be external from the radar system; and
   a second sender configured to send, to the vehicle operating condition controller, second information indicative of the second physical relationship,
   wherein, when it is detected that a failure occurs in the second measuring unit, the alternative control unit is configured to:
   cause the first measuring unit to serve as an alternative to the second measuring unit to thereby measure the second physical relationship; and
   deactivate the second sender.

6. A radar system according to claim 1, wherein, when it is detected that a failure occurs in the second measuring unit, the failure detector is configured to send, to the second measuring unit, an event signal indicative of the occurrence of failure, the second measuring unit is configured to:
   receive the event signal sent from the failure detector;
   send, to the first measuring unit, a measurement instruction indicative of execution of a measurement of the second physical relationship; and
   become inactivate after the sending of the measurement instruction, and
   the first measuring unit is configured to:
   receive the measurement instruction sent from the second measuring unit;
   receive the second echo signal received by the transmitter, and
   measure the second physical relationship between the vehicle and the second object based on the received second echo signal.

* * * * *